(12) United States Patent
Ryu et al.

(10) Patent No.: US 11,113,574 B1
(45) Date of Patent: Sep. 7, 2021

(54) METHODS FOR PERFORMING SELF-SUPERVISED LEARNING OF DEEP-LEARNING BASED DETECTION NETWORK BY USING DEEP Q-NETWORK AND DEVICES USING THE SAME

(71) Applicant: Stradvision, Inc., Pohang-si (KR)

(72) Inventors: Wooju Ryu, Pohang-si (KR); Bongnam Kang, Pohang-si (KR); Hongmo Je, Pohang-si (KR)

(73) Assignee: Stradvision, Inc., Gyeongsangbuk-do (KR)

( * ) Notice: Subject to any disclaimer, the term of this patent is extended or adjusted under 35 U.S.C. 154(b) by 0 days.

(21) Appl. No.: 17/213,853

(22) Filed: Mar. 26, 2021

(51) Int. Cl.
*G06K 9/00* (2006.01)
*G06T 3/40* (2006.01)
(Continued)

(52) U.S. Cl.
CPC ......... *G06K 9/6256* (2013.01); *G06K 9/6261* (2013.01); *G06K 9/6267* (2013.01)

(58) Field of Classification Search
CPC .... G06N 3/0454; G06N 3/0472; G06N 3/084; G06N 20/00; G06N 20/10; G06N 3/006; G06N 3/04; G06N 3/0445; G06N 3/08; G06N 3/082; G06N 3/088; G06N 7/005; G06T 2207/20081; G06T 2207/20084; G06T 7/70; G06T 2207/30148; G06T 3/0006; G06T 7/0004; G06T 7/11; G06T 7/174; G06F 17/18; G06K 9/00805; G06K 9/4628; G06K 9/6267; G06K 9/036; G06K 9/6269; G06K 9/6256; G06K 9/6261; G06K 9/6271; G06K 9/6297; B22F 10/20;
(Continued)

(56) References Cited

U.S. PATENT DOCUMENTS

2020/0247063 A1* 8/2020 Pinskiy ................. G06K 9/036

OTHER PUBLICATIONS

W. Xu, J. Yu, Z. Miao, L. Wan and Q. Ji, "Spatio-Temporal Deep Q-Networks for Human Activity Localization," in IEEE Transactions on Circuits and Systems for Video Technology, vol. 30, No. 9, pp. 2984-2999, Sep. 2020, doi: 10.1109/TCSVT.2019.2919064. ( Year: 2020).*

(Continued)

*Primary Examiner* — Michael J Vanchy, Jr.
(74) *Attorney, Agent, or Firm* — Taft Stettinius & Hollister LLP

(57) ABSTRACT

A method of self-supervised learning for detection network using deep Q-network includes steps of: performing object detection on first unlabeled image through the detection network trained with training database to generate first object detection information and performing learning operation on a first state set corresponding to the first object detection information to generate a Q-value, if an action of the Q-value accepts the first unlabeled image, testing the detection network, retrained with the training database additionally containing a labeled image of the first unlabeled image, to generate a first accuracy, and if the action rejects the first unlabeled image, testing the detection network without retraining, to generate a second accuracy, and storing the first state set, the action, a reward of the first or the second accuracy, and a second state set of a second unlabeled image as transition vector, and training the deep Q-network by using the transition vector.

20 Claims, 5 Drawing Sheets

(51) Int. Cl.
*G06N 3/04* (2006.01)
*G06K 9/62* (2006.01)

(58) Field of Classification Search
CPC ..... B22F 10/30; B29C 64/209; B29C 64/393; B33Y 10/00; B33Y 30/00; B33Y 50/02; Y02P 10/25
See application file for complete search history.

(56) References Cited

OTHER PUBLICATIONS

X. Han, H. Liu, F. Sun and X. Zhang, "Active Object Detection With Multistep Action Prediction Using Deep Q-Network," in IEEE Transactions on Industrial Informatics, vol. 15, No. 6, pp. 3723-3731, Jun. 2019, doi: 10.1109/TII.2019.2890849. (Year: 2019).*

* cited by examiner

METHODS FOR PERFORMING SELF-SUPERVISED LEARNING OF DEEP-LEARNING BASED DETECTION NETWORK BY USING DEEP Q-NETWORK AND DEVICES USING THE SAME

FIELD OF THE DISCLOSURE

The present disclosure relates to methods for performing self-supervised learning of a deep-learning based detection network by using a deep Q-network and devices using the same; and more particularly, to the methods for performing the self-supervised learning of the detection network by using the deep Q-network to determine training data suitable for the self-supervised learning of the detection network on the basis of objection detection information outputted from the detection network, and the devices using the same.

BACKGROUND OF THE DISCLOSURE

In order to effectively train a detection network capable of performing an object detection for recognizing locations and classes of objects included in images, a substantial amount of training data is required.

Conventionally, supervised learning that trains the detection network by using training data labeled with ground truths suggesting correct answers for the object detection has been commonly used to improve an accuracy of the object detection carried out by the detection network. However, in order for the supervised learning to be effective, a vast amount of the training data is required, and it is the job of human labelers to manually produce labels for each and every training data. As such, the more complex a given task of the object detection is, the longer time and the higher cost are incurred in training the detection network through the supervised learning. Therefore, alternative learning techniques for training the detection network are being developed in recent days.

As one example, in unsupervised learning, instead of using labeled training data, methods such as clustering or density estimation are used to train the detection network to find groups in given data or identify patterns among the given data. However, the unsupervised learning also has its limitations in that results of the clustering are difficult to be assessed without the use of the labeled training data and that defined groups or patterns may not be applicable to real-world data.

Also, as another alternative, self-supervised learning is also studied. For the self-supervised learning, a minimum amount of the labeled training data and a large amount of unlabeled training data are used for training the detection network.

In detail, the self-supervised learning initially trains the detection network by using the labeled training data, and then let the detection network to perform the given task of generating self-labeled training data from the unlabeled training data inputted into the detection network. Subsequently, the detection network is continuously trained by using the labeled training data obtained during the initial stage of learning and the self-labeled training data produced by the detection network itself.

In performing the self-supervise learning, a heuristic approach based on selection criteria such as model confidence is often used to select the self-labeled training data suitable for training the detection network. However, not only is it difficult to judge an accuracy of the selection criteria, but it requires considerable work to consistently adjust the selection criteria.

Therefore, an enhanced method for solving the aforementioned problems is required.

SUMMARY OF THE DISCLOSURE

It is an object of the present disclosure to solve all the aforementioned problems.

It is another object of the present disclosure to effectively select training data useful for increasing an accuracy of a detection network by using Q-values generated from a deep-Q network.

It is still another object of the present disclosure to perform reinforcement learning of the deep Q-network connected to the detection network by using the accuracy of the detection network as a reward such that the deep Q-network is trained to produce the Q-values capable of selecting the training data useful for increasing the accuracy of the detection network.

It is still yet another object of the present disclosure to perform self-supervised learning of the detection network by using the training data selected on the basis of the Q-values generated from the deep Q-network.

In accordance with one aspect of the present disclosure, there is provided a method for performing self-supervised learning of a deep-learning based detection network by using a deep Q-network, including steps of: (a) on condition that a detection network capable of performing an object detection has been trained with at least one training data stored in a training database, a learning device, upon acquiring at least one first unlabeled image from an unlabeled database, performing or supporting another device to perform processes of (i) inputting the first unlabeled image into the detection network, to thereby allow the detection network to perform the object detection on the first unlabeled image and thus to generate first object detection information, (ii) generating a first state set by referring to the first object detection information, wherein the first state set includes a $(1\_1)$-st classification confidence to a $(1\_k_1)$-th classification confidence, a $(1\_1)$-st regression uncertainty to a $(1\_k_1)$-th regression uncertainty, and a $(1\_1)$-st pooled feature map to a $(1\_k_1)$-th pooled feature map, respectively corresponding to a $(1\_1)$-st bounding box indicating a 1st object included in the first unlabeled image to a $(1\_k_1)$-th bounding box indicating a $k_1$th object included in the first unlabeled image, and wherein $k_1$ is an integer bigger than or equal to 1, (iii) inputting the first state set into a deep Q-network, to thereby allow the deep Q-network to perform a learning operation on the first state set and thus to generate a Q-value including an acceptance score and a rejection score, and (iv) generating an action by applying an argMax function to the Q-value, (b) the learning device performing or supporting another device to perform processes of (i) (i-1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (i-2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii) upon acquiring at least one second unlabeled image from the unlabeled database, (ii-1) inputting the second unlabeled image into the detection network, to thereby allow the detection network to perform the object detection on the second unlabeled image and thus to generate second object detection information, (ii-2) generating a second state set by referring to the second object detection information, wherein the second state set includes a $(2\_1)$-st classification confidence to a $(2\_k_2)$-th classification confidence, a $(2\_1)$-st regression uncertainty to a $(2\_k_2)$-th regression uncertainty, and a $(2\_1)$-st pooled feature map to a $(2\_k_2)$-th pooled feature map, respectively corresponding to a $(2\_1)$-st bounding box indicating a 1st object included in the second unlabeled image to a $(2\_k_2)$-th bounding box indicating a $k_2$th object included in the second unlabeled image, and wherein $k_2$ refers to an integer bigger than or equal to 1, and (ii-3) storing the first state set, the action, the reward, and the second state set as elements of a transition vector in a memory, and (c) the learning device performing or supporting another device to perform a process of generating a minibatch by sampling at least one specific transition vector to be used as at least one transition vector for training from the memory and then training the deep Q-network by using the minibatch such that the deep Q-network outputs the action for increasing the reward according to the first state set and the second state set.

As one example, at the step of (a), the learning device performs or supports another device to perform a process of allowing the deep Q-network to (i) apply at least one Fully-Connected operation to the $(1\_1)$-st classification confidence to the $(1\_k_1)$-th classification confidence, the $(1\_1)$-st regression uncertainty to the $(1\_k_1)$-th regression uncertainty, and the $(1\_1)$-st pooled feature map to the $(1\_k_1)$-th pooled feature map, respectively corresponding to the $(1\_1)$-st bounding box to the $(1\_k_1)$-th bounding box, to thereby generate a first intermediate acceptance score to a $k_1$th intermediate acceptance score and a first intermediate rejection score to a $k_1$th intermediate rejection score, respectively corresponding to the $(1\_1)$-st bounding box to the $(1\_k_1)$-th bounding box, and (ii) average the first intermediate acceptance score to the $k_1$th intermediate acceptance score, thus generating the acceptance score, and average the first intermediate rejection score to the $k_1$th intermediate rejection score, thus generating the rejection score, to thereby generate the Q-value including the acceptance score and the rejection score.

As another example, the learning device performs or supports another device to perform a process of allowing the deep Q-network to execute at least one 1×1 convolution operation and an m×m convolution operation on the $(1\_1)$-st pooled feature map to the $(1\_k_1)$-th pooled feature map, to thereby generate a first feature value to a $k_1$th feature value, and then execute the Fully-Connected operation on the $(1\_1)$-st classification confidence to the $(1\_k_1)$-th classification confidence, the $(1\_1)$-st regression uncertainty to the $(1\_k_1)$-th regression uncertainty, and the first feature value to the $k_1$th feature value, to thereby generate the first intermediate acceptance score to the $k_1$th intermediate acceptance score and the first intermediate rejection score to the $k_1$th intermediate rejection score.

As another example, the step (a), the step (b) and the step (c) are performed iteratively to thereby generate multiple transition vectors, and at the step of (c) for every iteration, the learning device performs or supports another device to perform a process of randomly selecting a*n or $2^n$ specific transition vectors to be used as multiple transition vectors for training from the memory in proportion to an accumulated volume of the transition vectors in the memory, to thereby generate the minibatch, and then training the deep Q-network by using the minibatch, wherein a and n are respectively integers bigger than or equal to 1 and n is increased by 1 for every predetermined number of iterations.

As another example, the step (a), the step (b) and the step (c) are performed iteratively to thereby generate multiple transition vectors, the memory includes a replay memory, and at the step of (c) for every iteration, the learning device performs or supports another device to perform a process of (i) transmitting each of the transition vectors to the replay memory, to thereby replace its corresponding oldest previously generated transition vector with each of the transition vectors according to a predetermined capacity of a cyclic buffer and thus to store each of the transition vectors in the replay memory, and (ii) generating the minibatch by randomly sampling specific transition vectors to be used as multiple transition vectors for training from the replay memory.

As another example, at the step of (a), the learning device performs or supports another device to perform a process of inputting the first unlabeled image into the detection network, to thereby allow the detection network to (i) apply at least one convolution operation to the first unlabeled image through at least one convolutional layer, and thus generate a first feature map corresponding to the first unlabeled image, (ii) generate ROIs corresponding to proposed regions where the $k_1$ objects are predicted to be positioned on the first unlabeled image through a region proposal network by referring to the first feature map, (iii) perform an ROI pooling operation on each of the proposed regions corresponding to each of the ROIs on the first feature map through a pooling layer, and thus generate each of pooled feature maps corresponding to each of the ROIs, (iv) apply at least one Fully-Connected operation to each of the pooled feature maps through at least one Fully-Connected layer and thus generate each piece of regression information and each piece of classification information corresponding to each of the ROIs, and (v) generate the $(1\_1)$-st bounding box to the $(1\_k_1)$-th bounding box and $(1\_1)$-st classification information to $(1\_k_1)$-th classification information, respectively corresponding to the $k_1$ objects included in the first unlabeled image, by referring to each piece of the regression information and each piece of the classification information corresponding to each of the ROIs.

In accordance with another aspect of the present disclosure, there is provided a method for performing self-supervised learning of a deep-learning based detection network by using a deep Q-network, including steps of: (a) on condition that (i) a detection network capable of performing an object detection has been trained with at least one training data stored in a training database and then a learning device, upon acquiring at least one first unlabeled image from an unlabeled database, has performed or supported another device to perform processes of (i-1) inputting the first unlabeled image into the detection network, to thereby allow the detection network to perform the object detection on the first unlabeled image and thus to generate first object detection information, (i-2) generating a first state set by referring to the first object detection information, wherein the first state set includes a $(1\_1)$-st classification confidence to a $(1\_k_1)$-th classification confidence, a $(1\_1)$-st regression uncertainty to a $(1\_k_1)$-th regression uncertainty, and a $(1\_1)$-st pooled feature map to a $(1\_k_1)$-th pooled feature map, respectively corresponding to a $(1\_1)$-st bounding box indicating a 1st object included in the first unlabeled image to a $(1\_k_1)$-th bounding box indicating a $k_1$th object included in the first unlabeled image, and wherein $k_1$ is an integer bigger than or equal to 1, (i-3) inputting the first state set into a deep Q-network, to thereby allow the deep Q-network to perform a learning operation on the first state set and thus to generate a Q-value including an acceptance score and a rejection score, and (i-4) generating an action by applying an argMax function to the Q-value, (ii) (ii-1) (1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii-2) upon acquiring at least one second unlabeled image from the unlabeled database, (1) inputting the second unlabeled image into the detection network, to thereby allow the detection network to perform the object detection on the second unlabeled image and thus to generate second object detection information, (2) generating a second state set by referring to the second object detection information, wherein the second state set includes a $(2\_1)$-st classification confidence to a $(2\_k_2)$-th classification confidence, a $(2\_1)$-st regression uncertainty to a $(2\_k_2)$-th regression uncertainty, and a $(2\_1)$-st pooled feature map to a $(2\_k_2)$-th pooled feature map, respectively corresponding to a $(2\_1)$-st bounding box indicating a 1st object included in the second unlabeled image to a $(2\_k_2)$-th bounding box indicating a $k_2$th object included in the second unlabeled image, and wherein $k_2$ refers to an integer bigger than or equal to 1, and (3) storing the first state set, the action, the reward, and the second state set as elements of a transition vector in a memory, and (iii) generating a minibatch by sampling at least one specific transition vector to be used as at least one transition vector for training from the memory and then training the deep Q-network by using the minibatch such that the deep Q-network outputs the action for increasing the reward according to the first state set and the second state set, a self-learning device, upon acquiring at least one new unlabeled image from a new unlabeled database, performing or supporting another device to perform processes of (i) inputting the new unlabeled image into the detection network, to thereby allow the detection network to perform the object detection on the new unlabeled image and thus to generate new object detection information, (ii) generating a new state set by referring to the new object detection information, wherein the new state set includes a first new classification confidence to a $k_3$th new classification confidence, a first new regression uncertainty to a $k_3$th new regression uncertainty, and a first new pooled feature map to a $k_3$th new pooled feature map, respectively corresponding to a first new bounding box indicating a 1st object included in the new unlabeled image to a $k_3$th new bounding box indicating a $k_3$th object included in the new unlabeled image, and wherein the $k_3$ refers to an integer bigger than or equal to 1, (iii) inputting the new state set into the deep Q-network, to thereby allow the deep Q-network to perform the learning operation on the new state set and thus to generate a new Q-value including a new acceptance score and a new rejection score, and (iv) generating a new action by applying the argMax function to the new Q-value, and (b) the self-learning device performing or supporting another device to perform processes of (i) if the new action is determined as corresponding to an acceptance of the new unlabeled image, adding a new labeled image to the training database as the training data wherein the new labeled image is generated by inserting the new object detection information into the new unlabeled image, deleting the new unlabeled image from the new unlabeled database, and retraining the detection network by using at least one of the training data included in the training database, and (ii) if the new action is determined as corresponding to a rejection of the new unlabeled image, deleting the new unlabeled image from the new unlabeled database.

As one example, at the step of (a), the self-learning device performs or supports another device to perform a process of allowing the deep Q-network to (i) apply at least one Fully-Connected operation to the first new classification confidence to the $k_3$th new classification confidence, the first new regression uncertainty to the $k_3$th new regression uncertainty, and the first new pooled feature map to the $k_3$th new pooled feature map, respectively corresponding to the first new bounding box to the $k_3$th new bounding box, to thereby generate a first new intermediate acceptance score to a $k_3$th new intermediate acceptance score and a first new intermediate rejection score to a $k_3$th new intermediate rejection score, respectively corresponding to the first new bounding box to the $k_3$th new bounding box, and (ii) average the first new intermediate acceptance score to the $k_3$th new intermediate acceptance score, thus generating the new acceptance score, and average the first new intermediate rejection score to the $k_3$th new intermediate rejection score, thus generating the new rejection score, to thereby generate the new Q-value including the new acceptance score and the new rejection score.

As another example, the self-learning device performs or supports another device to perform a process of allowing the deep Q-network to execute at least one 1×1 convolution operation and an m×m convolution operation on the first new pooled feature map to the $k_3$th new pooled feature map, to thereby generate a first new feature value to a $k_3$th new feature value, and then execute the Fully-Connected operation on the first new classification confidence to the $k_3$th new classification confidence, the first new regression uncertainty to the $k_3$th new regression uncertainty, and the first new feature value to the $k_3$th new feature value, to thereby generate the first new intermediate acceptance score to the $k_3$th new intermediate acceptance score and the first new intermediate rejection score to the $k_3$th new intermediate rejection score.

As another example, at the step of (a), the self-learning device performs or supports another device to perform a process of inputting the new unlabeled image into the detection network, to thereby allow the detection network to (i) apply at least one convolution operation to the new unlabeled image through at least one convolutional layer, and thus generate a new feature map corresponding to the new unlabeled image, (ii) generate new ROIs corresponding to new proposed regions where the $k_3$ objects are predicted to be positioned on the new unlabeled image through a region proposal network by referring to the new feature map, (iii) perform an ROI pooling operation on each of the new proposed regions corresponding to each of the new ROIs on the new feature map through a pooling layer, and thus generate each of new pooled feature maps corresponding to each of the new ROIs, (iv) apply at least one Fully-Connected operation to each of the new pooled feature maps through at least one Fully-Connected layer and thus generate each piece of new regression information and each piece of new classification information corresponding to each of the new ROIs, and (v) generate the first new bounding box to the $k_3$th new bounding box and first new classification information to $k_3$th new classification information, respectively corresponding to the $k_3$ objects included in the new unlabeled image, by referring to each piece of the new regression information and each piece of the new classification information corresponding to each of the new ROIs.

In accordance with still another aspect of the present disclosure, there is provided a learning device for performing self-supervised learning of a deep-learning based detection network by using a deep Q-network, including: at least one memory that stores instructions; and at least one processor configured to execute the instructions to perform or support another device to perform: processes of (I) on condition that a detection network capable of performing an object detection has been trained with at least one training data stored in a training database, upon acquiring at least one first unlabeled image from an unlabeled database, (i) inputting the first unlabeled image into the detection network, to thereby allow the detection network to perform the object detection on the first unlabeled image and thus to generate first object detection information, (ii) generating a first state set by referring to the first object detection information, wherein the first state set includes a (1_1)-st classification confidence to a (1_$k_1$)-th classification confidence, a (1_1)-st regression uncertainty to a (1_$k_1$)-th regression uncertainty, and a (1_1)-st pooled feature map to a (1_$k_1$)-th pooled feature map, respectively corresponding to a (1_1)-st bounding box indicating a 1st object included in the first unlabeled image to a (1_$k_1$)-th bounding box indicating a $k_1$th object included in the first unlabeled image, and wherein $k_1$ is an integer bigger than or equal to 1, (iii) inputting the first state set into a deep Q-network, to thereby allow the deep Q-network to perform a learning operation on the first state set and thus to generate a Q-value including an acceptance score and a rejection score, and (iv) generating an action by applying an argMax function to the Q-value, (II) (i) (i-1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (i-2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii) upon acquiring at least one second unlabeled image from the unlabeled database, (ii-1) inputting the second unlabeled image into the detection network, to thereby allow the detection network to perform the object detection on the second unlabeled image and thus to generate second object detection information, (ii-2) generating a second state set by referring to the second object detection information, wherein the second state set includes a (2_1)-st classification confidence to a (2_$k_2$)-th classification confidence, a (2_1)-st regression uncertainty to a (2_$k_2$)-th regression uncertainty, and a (2_1)-st pooled feature map to a (2_$k_2$)-th pooled feature map, respectively corresponding to a (2_1)-st bounding box indicating a 1st object included in the second unlabeled image to a (2_$k_2$)-th bounding box indicating a $k_2$th object included in the second unlabeled image, and wherein $k_2$ refers to an integer bigger than or equal to 1, and (ii-3) storing the first state set, the action, the reward, and the second state set as elements of a transition vector in a memory, and (III) generating a minibatch by sampling at least one specific transition vector to be used as at least one transition vector for training from the memory and then training the deep Q-network by using the minibatch such that the deep Q-network outputs the action for increasing the reward according to the first state set and the second state set.

As one example, at the process of (I), the processor performs or supports another device to perform a process of allowing the deep Q-network to (i) apply at least one Fully-Connected operation to the (1_1)-st classification confidence to the (1_$k_1$)-th classification confidence, the (1_1)-st regression uncertainty to the (1_$k_1$)-th regression uncertainty, and the (1_1)-st pooled feature map to the (1_$k_1$)-th pooled feature map, respectively corresponding to the (1_1)-st bounding box to the (1_$k_1$)-th bounding box, to thereby generate a first intermediate acceptance score to a $k_1$th intermediate acceptance score and a first intermediate rejection score to a $k_1$th intermediate rejection score, respectively corresponding to the (1_1)-st bounding box to the (1_$k_1$)-th bounding box, and (ii) average the first intermediate acceptance score to the $k_1$th intermediate acceptance score, thus generating the acceptance score, and average the first intermediate rejection score to the $k_1$th intermediate rejection score, thus generating the rejection score, to thereby generate the Q-value including the acceptance score and the rejection score.

As another example, the processor performs or supports another device to perform a process of allowing the deep Q-network to execute at least one 1×1 convolution operation and an m×m convolution operation on the (1_1)-st pooled feature map to the (1_$k_1$)-th pooled feature map, to thereby generate a first feature value to a $k_1$th feature value, and then execute the Fully-Connected operation on the (1_1)-st classification confidence to the (1_$k_1$)-th classification confidence, the (1_1)-st regression uncertainty to the (1_$k_1$)-th regression uncertainty, and the first feature value to the $k_1$th feature value, to thereby generate the first intermediate acceptance score to the $k_1$th intermediate acceptance score and the first intermediate rejection score to the $k_1$th intermediate rejection score.

As another example, the process (I), the process (II) and the process (III) are performed iteratively to thereby generate multiple transition vectors, and at the process of (III) for every iteration, the processor performs or supports another device to perform a process of randomly selecting a*n or $2^n$ specific transition vectors to be used as multiple transition vectors for training from the memory in proportion to an accumulated volume of the transition vectors in the memory, to thereby generate the minibatch, and then training the deep Q-network by using the minibatch, wherein a and n are respectively integers bigger than or equal to 1 and n is increased by 1 for every predetermined number of iterations.

As another example, the process (I), the process (II) and the process (III) are performed iteratively to thereby generate multiple transition vectors, the memory includes a replay memory, and at the process of (III) for every iteration, the processor performs or supports another device to perform a process of (i) transmitting each of the transition vectors to the replay memory, to thereby replace its corresponding oldest previously generated transition vector with each of the transition vectors according to a predetermined capacity of a cyclic buffer and thus to store each of the transition vectors in the replay memory, and (ii) generating the minibatch by randomly sampling specific transition vectors to be used as multiple transition vectors for training from the replay memory.

As another example, at the process of (I), the processor performs or supports another device to perform a process of inputting the first unlabeled image into the detection network, to thereby allow the detection network to (i) apply at least one convolution operation to the first unlabeled image through at least one convolutional layer, and thus generate a first feature map corresponding to the first unlabeled image, (ii) generate ROIs corresponding to proposed regions where the $k_1$ objects are predicted to be positioned on the first unlabeled image through a region proposal network by referring to the first feature map, (iii) perform an ROI pooling operation on each of the proposed regions corresponding to each of the ROIs on the first feature map through a pooling layer, and thus generate each of pooled feature maps corresponding to each of the ROIs, (iv) apply at least one Fully-Connected operation to each of the pooled feature maps through at least one Fully-Connected layer and thus generate each piece of regression information and each piece of classification information corresponding to each of the ROIs, and (v) generate the (1_1)-st bounding box to the (1_$k_1$)-th bounding box and (1_1)-st classification information to (1_$k_1$)-th classification information, respectively corresponding to the $k_1$ objects included in the first unlabeled image, by referring to each piece of the regression information and each piece of the classification information corresponding to each of the ROIs.

In accordance with still yet another aspect of the present disclosure, there is provided a self-learning device for performing self-supervised learning of a deep-learning based detection network by using a deep Q-network, including: at least one memory that stores instructions; and at least one processor configured to execute the instructions to perform or support another device to perform: processes of (I) on condition that (i) a detection network capable of performing an object detection has been trained with at least one training data stored in a training database and then a learning device, upon acquiring at least one first unlabeled image from an unlabeled database, has performed or supported another device to perform processes of (i-1) inputting the first unlabeled image into the detection network, to thereby allow the detection network to perform the object detection on the first unlabeled image and thus to generate first object detection information, (i-2) generating a first state set by referring to the first object detection information, wherein the first state set includes a (1_1)-st classification confidence to a (1_$k_1$)-th classification confidence, a (1_1)-st regression uncertainty to a (1_$k_1$)-th regression uncertainty, and a (1_1)-st pooled feature map to a (1_$k_1$)-th pooled feature map, respectively corresponding to a (1_1)-st bounding box indicating a 1st object included in the first unlabeled image to a (1_$k_1$)-th bounding box indicating a $k_1$th object included in the first unlabeled image, and wherein $k_1$ is an integer bigger than or equal to 1, (i-3) inputting the first state set into a deep Q-network, to thereby allow the deep Q-network to perform a learning operation on the first state set and thus to generate a Q-value including an acceptance score and a rejection score, and (i-4) generating an action by applying an argMax function to the Q-value, (ii) (ii-1) (1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii-2) upon acquiring at least one second unlabeled image from the unlabeled database, (1) inputting the second unlabeled image into the detection network, to thereby allow the detection network to perform the object detection on the second unlabeled image and thus to generate second object detection information, (2) generating a second state set by referring to the second object detection information, wherein the second state set includes a (2_1)-st classification confidence to a (2_$k_2$)-th classification confidence, a (2_1)-st regression uncertainty to a (2_$k_2$)-th regression uncertainty, and a (2_1)-st pooled feature map to a (2_$k_2$)-th pooled feature map, respectively corresponding to a (2_1)-st bounding box indicating a 1st object included in the second unlabeled image to a (2_$k_2$)-th bounding box indicating a $k_2$th object included in the second unlabeled image, and wherein $k_2$ refers to an integer bigger than or equal to 1, and (3) storing the first state set, the action, the reward, and the second state set as elements of a transition vector in a memory, and (iii) generating a minibatch by sampling at least one specific transition vector to be used as at least one transition vector for training from the memory and then training the deep Q-network by using the minibatch such that the deep Q-network outputs the action for increasing the reward according to the first state set and the second state set, upon acquiring at least one new unlabeled image from a new unlabeled database, (i) inputting the new unlabeled image into the detection network, to thereby allow the detection network to perform the object detection on the new unlabeled image and thus to generate new object detection information, (ii) generating a new state set by referring to the new object detection information, wherein the new state set includes a first new classification confidence to a $k_3$th new classification confidence, a first new regression uncertainty to a $k_3$th new regression uncertainty, and a first new pooled feature map to a $k_3$th new pooled feature map, respectively corresponding to a first new bounding box indicating a 1st object included in the new unlabeled image to a $k_3$th new bounding box indicating a $k_3$th object included in the new unlabeled image, and wherein the $k_3$ refers to an integer bigger than or equal to 1, (iii) inputting the new state set into the deep Q-network, to thereby allow the deep Q-network to perform the learning operation on the new state set and thus to generate a new Q-value including a new acceptance score and a new rejection score, and (iv) generating a new action by applying the argMax function to the new Q-value, and (II) (i) if the new action is determined as corresponding to an acceptance of the new unlabeled image, adding a new labeled image to the training database as the training data wherein the new labeled image is generated by inserting the new object detection information into the new unlabeled image, deleting the new unlabeled image from the new unlabeled database, and retraining the detection network by using at least one of the training data included in the training database, and (ii) if the new action is determined as corresponding to a rejection of the new unlabeled image, deleting the new unlabeled image from the new unlabeled database.

As one example, at the process of (I), the processor performs or supports another device to perform a process of allowing the deep Q-network to (i) apply at least one Fully-Connected operation to the first new classification confidence to the $k_3$th new classification confidence, the first new regression uncertainty to the $k_3$th new regression uncertainty, and the first new pooled feature map to the $k_3$th new pooled feature map, respectively corresponding to the first new bounding box to the $k_3$th new bounding box, to thereby generate a first new intermediate acceptance score to a $k_3$th new intermediate acceptance score and a first new intermediate rejection score to a $k_3$th new intermediate rejection score, respectively corresponding to the first new bounding box to the $k_3$th new bounding box, and (ii) average the first new intermediate acceptance score to the $k_3$th new intermediate acceptance score, thus generating the new acceptance score, and average the first new intermediate rejection score to the $k_3$th new intermediate rejection score, thus generating the new rejection score, to thereby generate the new Q-value including the new acceptance score and the new rejection score.

As another example, the processor performs or supports another device to perform a process of allowing the deep Q-network to execute at least one 1×1 convolution operation and an m×m convolution operation on the first new pooled feature map to the $k_3$th new pooled feature map, to thereby generate a first new feature value to a $k_3$th new feature value, and then execute the Fully-Connected operation on the first new classification confidence to the $k_3$th new classification confidence, the first new regression uncertainty to the $k_3$th new regression uncertainty, and the first new feature value to the $k_3$th new feature value, to thereby generate the first new intermediate acceptance score to the $k_3$th new intermediate acceptance score and the first new intermediate rejection score to the $k_3$th new intermediate rejection score.

As another example, at the process of (I), the processor performs or supports another device to perform a process of inputting the new unlabeled image into the detection network, to thereby allow the detection network to (i) apply at least one convolution operation to the new unlabeled image through at least one convolutional layer, and thus generate a new feature map corresponding to the new unlabeled image, (ii) generate new ROIs corresponding to new proposed regions where the $k_3$ objects are predicted to be positioned on the new unlabeled image through a region proposal network by referring to the new feature map, (iii) perform an ROI pooling operation on each of the new proposed regions corresponding to each of the new ROIs on the new feature map through a pooling layer, and thus generate each of new pooled feature maps corresponding to each of the new ROIs, (iv) apply at least one Fully-Connected operation to each of the new pooled feature maps through at least one Fully-Connected layer and thus generate each piece of new regression information and each piece of new classification information corresponding to each of the new ROIs, and (v) generate the first new bounding box to the $k_3$th new bounding box and first new classification information to $k_3$th new classification information, respectively corresponding to the $k_3$ objects included in the new unlabeled image, by referring to each piece of the new regression information and each piece of the new classification information corresponding to each of the new ROIs.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
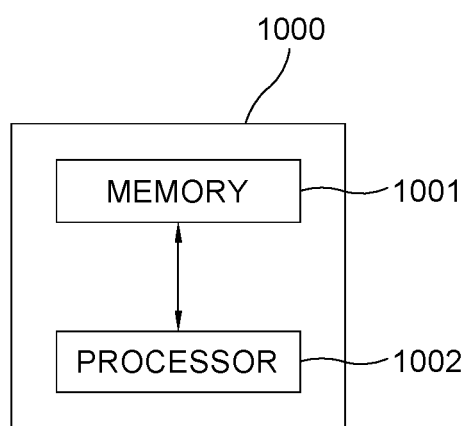
FIG. 1 is a drawing schematically illustrating a learning device performing reinforcement learning of a deep Q-network to allow the deep Q-network to select training data useful for self-supervised learning of a deep-learning based detection network by referring to object detection information outputted from the detection network in accordance with one example embodiment of the present disclosure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

The headings and abstract of the present disclosure provided herein are for convenience only and do not limit or interpret the scope or meaning of the embodiments.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a learning device 1000 performing reinforcement learning of a deep Q-network to allow the deep Q-network to select training data useful for self-supervised learning of a deep-learning based detection network by referring to object detection information outputted from the detection network in accordance with one example embodiment of the present disclosure.

By referring to FIG. 1, the learning device 1000 may include a memory 1001 for performing the reinforcement learning of the deep Q-network, and a processor 1002 for performing the reinforcement learning of the deep Q-network according to the instructions in the memory 1001.

Specifically, the learning device 1000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

A process of performing the reinforcement learning of the deep Q-network to allow the deep Q-network to select the training data useful for the self-supervised learning of the deep-learning based detection network by referring to the object detection information outputted from the detection network through using the learning device 1000 configured as explained above is described by referring to FIGS. 2 and 3.

Figure 2:
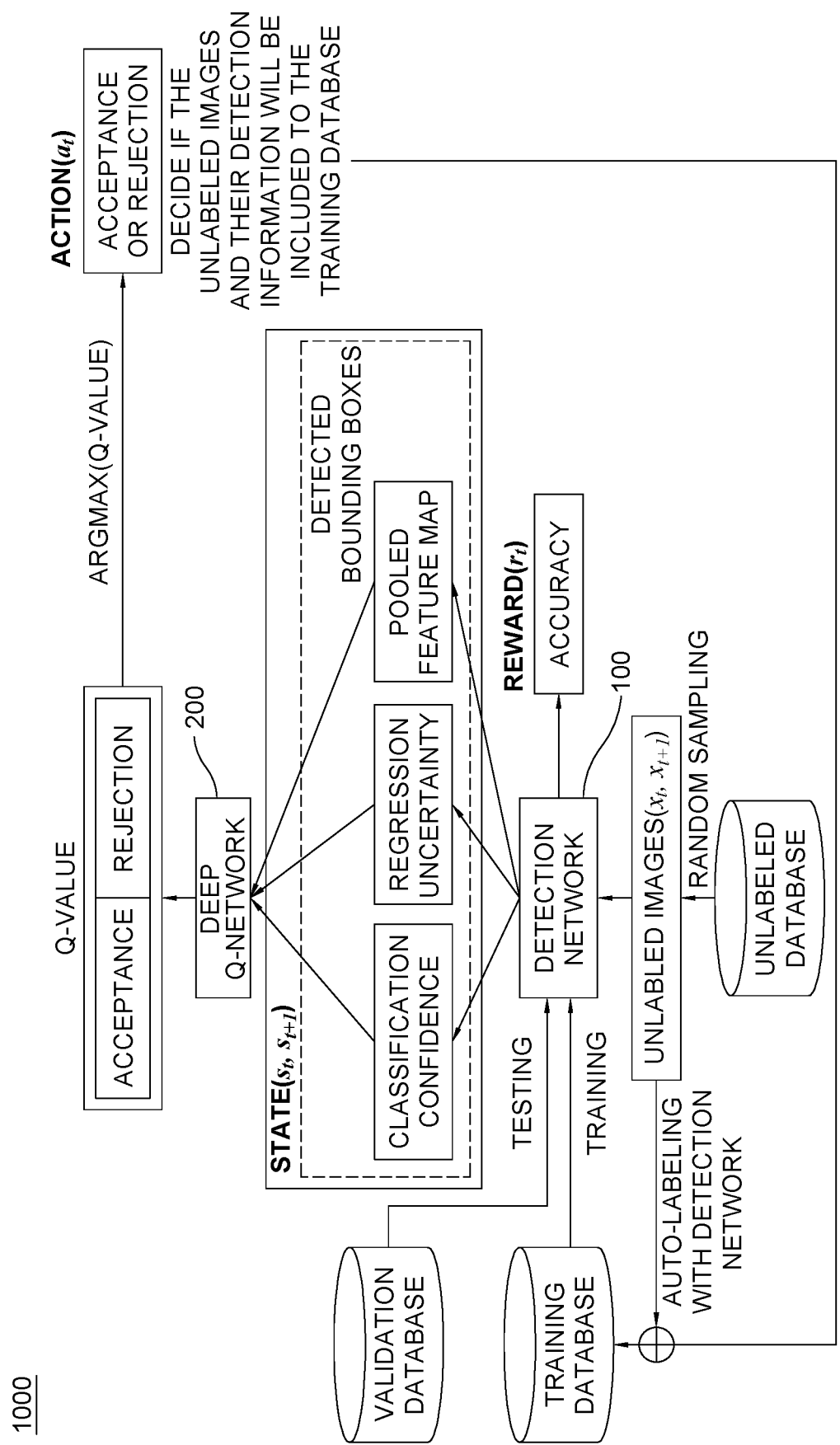
FIG. 2 is a drawing schematically illustrating a process for performing the reinforcement learning of the deep Q-network to allow the deep Q-network to select the training data useful for the self-supervised learning of the deep-learning based detection network by referring to the object detection information outputted from the detection network in accordance with one example embodiment of the present disclosure.

First, FIG. 2 is a drawing schematically illustrating a process for performing the reinforcement learning of the deep Q-network to allow the deep Q-network to select the training data useful for the self-supervised learning of the deep-learning based detection network by referring to the object detection information outputted from the detection network in accordance with one example embodiment of the present disclosure.

By referring to FIG. 2, on condition that the detection network 100 capable of performing an object detection has been trained with at least one training data stored in a training database, the learning device 1000, upon acquiring at least one first unlabeled image from an unlabeled database, may input the first unlabeled image into the detection network 100, to thereby allow the detection network 100 to perform the object detection on the first unlabeled image and thus to generate first object detection information. Herein, the first unlabeled image may be randomly selected from the unlabeled database. Also, the training data used for an initial learning of the detection network 100 may have already been fully annotated by using their corresponding ground truths. On the other hand, the unlabeled database may be storing unlabeled images which have not been annotated with their corresponding ground truths.

In detail, the learning device 1000 may input the first unlabeled image into the detection network 100, to thereby allow the detection network 100 to apply at least one convolution operation to the first unlabeled image through at least one convolutional layer, and thus generate a first feature map corresponding to the first unlabeled image. Then, the learning device 1000 may generate first ROIs (Regions of Interest) corresponding to proposed regions where $k_1$ objects are predicted to be positioned on the first unlabeled image through a region proposal network by referring to the first feature map, and perform an ROI pooling operation on each of the proposed regions corresponding to each of the first ROIs on the first feature map through a pooling layer, and thus generate each of first pooled feature maps corresponding to each of the first ROIs. Subsequently, the learning device 1000 may apply at least one first Fully-Connected operation to each of the first pooled feature maps through at least one Fully-Connected layer and thus generate each piece of first regression information and each piece of first classification information corresponding to each of the first ROIs. Lastly, the learning device 1000 may generate (1_1)-st bounding box to (1_$k_1$)-th bounding box and (1_1)-st classification information to (1_$k_1$)-th classification information, respectively corresponding to the $k_1$ objects included in the first unlabeled image, by referring to each piece of the first regression information and each piece of the first classification information corresponding to each of the first ROIs. Herein, the (1_1)-st classification information to the (1_$k_1$)-th classification information may include a (1_1)-st classification confidence to a (1_$k_1$)-th classification confidence, and the (1_1)-st bounding box to the (1_$k_1$)-th bounding box may include a (1_1)-st regression uncertainty to a (1_$k_1$)-th regression uncertainty. Also, $k_1$ is an integer bigger than or equal to 1, and may vary depending on the number of objects present in the first unlabeled image.

Following, the learning device 1000 may generate a first state set by referring to the first object detection information, wherein the first state set includes the (1_1)-st classification confidence to the (1_$k_1$)-th classification confidence, the (1_1)-st regression uncertainty to the (1_$k_1$)-th regression uncertainty, and a (1_1)-st pooled feature map to a (1_$k_1$)-th pooled feature map, respectively corresponding to the (1_1)-st bounding box indicating a 1st object included in the first unlabeled image to the (1_$k_1$)-th bounding box indicating a $k_1$ object included in the first unlabeled image.

Accordingly, the learning device 1000 may input the first state set into the deep Q-network 200, to thereby allow the deep Q-network 200 to perform a learning operation on the first state set and thus to generate a Q-value including an acceptance score and a rejection score. Then, the learning device 1000 may generate an action by applying an argMax function to the Q-value.

Figure 3:
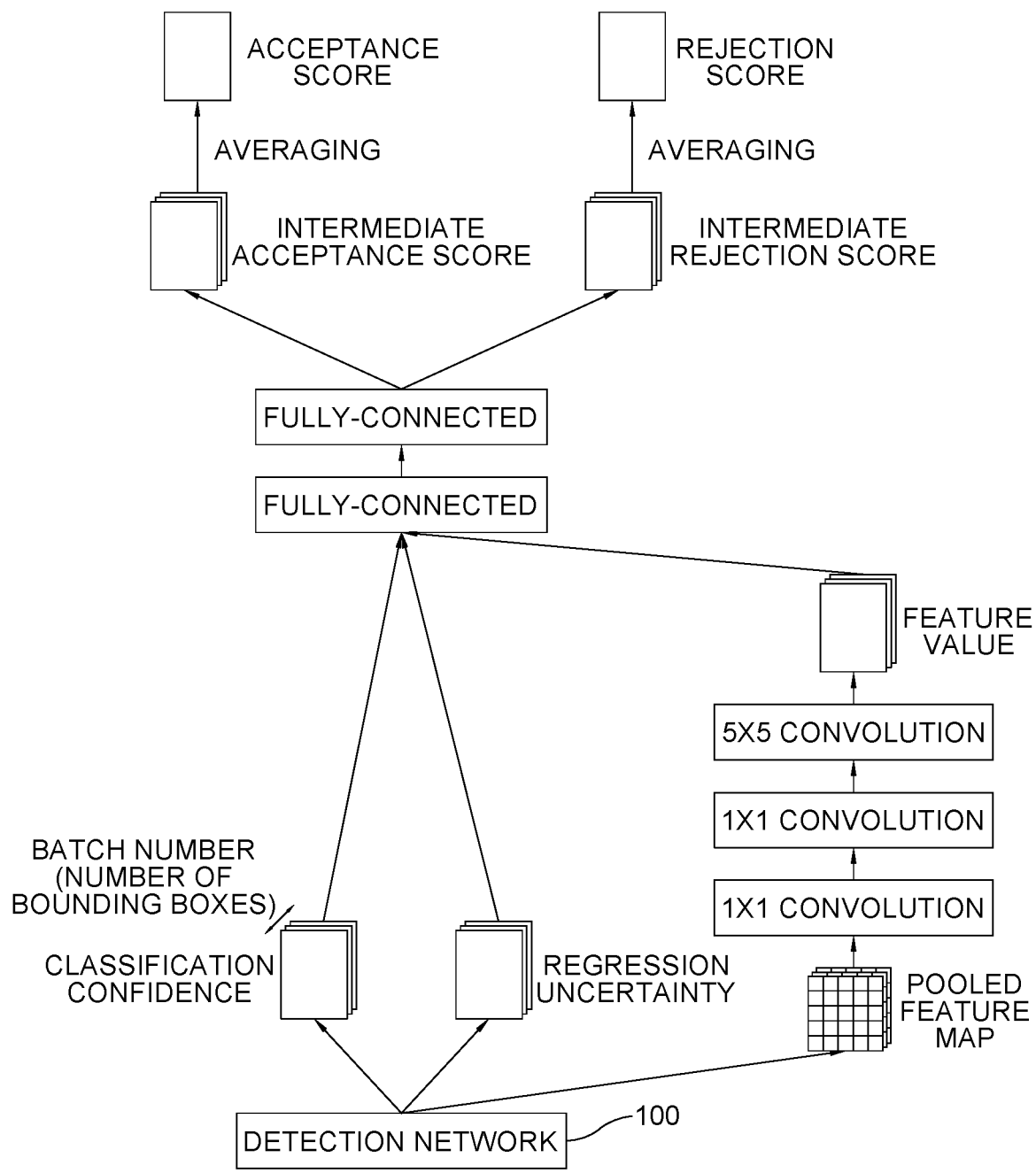
FIG. 3 is a drawing schematically illustrating a structure of the deep Q-network in accordance with one example embodiment of the present disclosure.

In detail, by referring to FIG. 3, the learning device 1000 may allow the deep Q-network 200 to apply at least one second Fully-Connected operation to the (1_1)-st classification confidence to the (1_$k_1$)-th classification confidence, the (1_1)-st regression uncertainty to the (1_$k_1$)-th regression uncertainty, and the (1_1)-st pooled feature map to the (1_$k_1$)-th pooled feature map, respectively corresponding to the (1_1)-st bounding box to the (1_$k_1$)-th bounding box, to thereby generate a first intermediate acceptance score to a $k_1$th intermediate acceptance score and a first intermediate rejection score to a $k_1$th intermediate rejection score, respectively corresponding to the (1_1)-st bounding box to the (1_$k_1$)-th bounding box.

Herein, the learning device 1000 may allow the deep Q-network 200 to execute at least one 1×1 convolution operation and an m×m convolution operation on the (1_1)-st pooled feature map to the (1_$k_1$)-th pooled feature map, to thereby generate a first feature value to a $k_1$th feature value, and then execute the second Fully-Connected operation on the (1_1)-st classification confidence to the (1_$k_1$)-th classification confidence, the (1_1)-st regression uncertainty to the (1_$k_1$)-th regression uncertainty, and the first feature value to the $k_1$th feature value. By doing so, data formats of components in the first state set, i.e., the (1_1)-st classification confidence to the (1_$k_1$)-th classification confidence, the (1_1)-st regression uncertainty to the (1_$k_1$)-th regression uncertainty, and the (1_1)-st pooled feature map to the (1_$k_1$)-th pooled feature map, may be made to be identical or similar to one another, prior to executing the second Fully-Connection operation on the components in the first state set. Herein, m×m may correspond to a size of the (1_1)-st pooled feature map to the (1_$k_1$)-th pooled feature map.

As shown for example in FIG. 3, if each of the (1_1)-st pooled feature map to the (1_$k_1$)-th pooled feature map has a size of (5×5), at least one 1×1 convolution operation and a 5×5 convolution operation may be applied to the (1_1)-st pooled feature map to the (1_$k_1$)-th pooled feature map, to thereby generate the first feature value to the $k_1$th feature value. Subsequently, the second Fully-Connected operation may be executed on the (1_1)-st classification confidence to the (1_$k_1$)-th classification confidence, the (1_1)-st regression uncertainty to the (1_$k_1$)-th regression uncertainty, and the first feature value to the $k_1$th feature value, to thereby generate the first intermediate acceptance score to the $k_1$th intermediate acceptance score and the first intermediate rejection score to the $k_1$th intermediate rejection score.

Next, the learning device 1000 may allow the deep Q-network 200 to average the first intermediate acceptance score to the $k_1$th intermediate acceptance score, thus generating the acceptance score, and average the first intermediate rejection score to the $k_1$th intermediate rejection score, thus generating the rejection score, to thereby generate the Q-value including the acceptance score and the rejection score.

Following, by referring to FIG. 2 again, if the action generated by applying the argMax function to the Q-value is determined as corresponding to an acceptance of the first unlabeled image, the learning device 1000 may add a labeled image to the training database as the training data wherein the labeled image is generated by inserting the first object detection information into the first unlabeled image. At the same time, the learning device 1000 may delete the first unlabeled image from the unlabeled database and retrain the detection network 100 by using at least one of the training data included in the training database, thus generating a reward by referring to a first accuracy. Herein, the first accuracy may be obtained from a result of testing the detection network 100 by using a validation database. For example, the first accuracy may be set to be a mAP (mean Average Precision) obtained by comparing test object detection information with their corresponding ground truths. Herein, the test object detection information may be generated through the detection network 100 by performing the objection detection on test data included in the validation database On the other hand, if the action is determined as corresponding to a rejection of the first unlabeled image, the learning device 1000 may delete the first unlabeled image from the unlabeled database and generate the reward by referring to a second accuracy wherein the second accuracy is obtained from a result of testing the detection network 100 by using the validation database. Herein, the second accuracy may be obtained based on a current state of the detection network 100 which has not been retrained with the training database. That is, since the second accuracy is measured without retraining the detection network 100, the second accuracy may not have been changed from a previously measured accuracy.

Next, upon acquiring at least one second unlabeled image from the unlabeled database, the learning device 1000 may input the second unlabeled image into the detection network 100, to thereby allow the detection network 100 to perform the object detection on the second unlabeled image and thus to generate second object detection information. Herein, the second unlabeled image may be randomly selected from the unlabeled database.

In detail, the learning device 1000 may input the second unlabeled image into the detection network 100, to thereby allow the detection network 100 to apply the convolution operation to the second unlabeled image through the convolutional layer, and thus generate a second feature map corresponding to the second unlabeled image. Then, the learning device 1000 may generate second ROIs (Regions of Interest) corresponding to proposed regions where $k_2$ objects are predicted to be positioned on the second unlabeled image through the region proposal network by referring to the second feature map, and perform the ROI pooling operation on each of the proposed regions corresponding to each of the second ROIs on the second feature map through the pooling layer, and thus generate each of second pooled feature maps corresponding to each of the second ROIs. Subsequently, the learning device 1000 may apply the first Fully-Connected operation to each of the second pooled feature maps through the Fully-Connected layer and thus generate each piece of second regression information and each piece of second classification information corresponding to each of the second ROIs. Lastly, the learning device 1000 may generate (2_1)-st bounding box to (2_$k_2$)-th bounding box and (2_1)-st classification information to (2_$k_2$)-th classification information, respectively corresponding to the $k_2$ objects included in the second unlabeled image, by referring to each piece of the second regression information and each piece of the second classification information corresponding to each of the second ROIs. Herein, the (2_1)-st classification information to the (2_$k_2$)-th classification information may include a (2_1)-st classification confidence to a (2_$k_2$)-th classification confidence, and the (2_1)-st bounding box to the (2_$k_2$)-th bounding box may include a (2_1)-st regression uncertainty to a (2_$k_2$)-th regression uncertainty. Also, $k_2$ is an integer bigger than or equal to 1, and may vary depending on the number of objects present in the second unlabeled image.

Following, the learning device 1000 may generate a second state set by referring to the second object detection information, wherein the second state set includes the (2_1)-st classification confidence to the (2_$k_2$)-th classification confidence, the (2_1)-st regression uncertainty to the (2_$k_2$)-th regression uncertainty, and a (2_1)-st pooled feature map to a (2_$k_2$)-th pooled feature map, respectively corresponding to the (2_1)-st bounding box indicating a 1st object included in the second unlabeled image to the (2_$k_2$)-th bounding box indicating a $k_2$th object included in the second unlabeled image.

Next, the learning device 1000 may store the first state set, the action, the reward, and the second state set as elements of a transition vector in a memory. Herein, the learning device 1000 may first store the first state set, the action, and the reward corresponding to the first unlabeled image in the memory, and additionally store the second state set in the memory upon acquiring the second state set. Also, the elements of the transition vector may be referred to as components included in the transition vector, and the transition vector may be stored in the memory in the form of a tuple.

Following, the learning device 1000 may generate a minibatch by sampling at least one specific transition vector to be used as at least one transition vector for training from the memory and then train the deep Q-network 200 by using the minibatch such that the deep Q-network 200 outputs the action for increasing the reward according to the first state set and the second state set. Herein, a loss function based on Bellman's equation may be formulated by referring to the transition vector for training included in the minibatch, and thus the deep Q-network 200 may be trained by minimizing a loss from the loss function.

Meanwhile, the step of generating the first state set, the action, the reward, and the second state set as explained above may be performed iteratively to thereby generate multiple transition vectors, and the memory may include a replay memory. Accordingly, for every iteration, the learning device 1000 may transmit each of the transition vectors to the replay memory, to thereby replace its corresponding oldest previously generated transition vector with each of the transition vectors according to a predetermined capacity of a cyclic buffer and thus to store each of the transition vectors in the replay memory. As a result, the learning device 1000 may generate the minibatch by randomly selecting specific transition vectors to be used as multiple transition vectors for training from the replay memory.

Also, as an example to sample the minibatch to train the deep Q-network for every iteration, the learning device 1000 may randomly select a*n or $2^n$ specific transition vectors to be used as the multiple transition vectors for training from the memory in proportion to an accumulated volume of the transition vectors in the memory, to thereby generate the minibatch. Herein, a and n are respectively integers bigger than or equal to 1 and n is increased by 1 for every predetermined number of iterations.

The reinforcement learning of the deep Q-network 200 as explained above may be carried out by using a pseudocode below. In the pseudocode below, the detection network 100 is represented as Detection-Net, and the deep Q-network 200 is represented as Q-Net. According to the pseudocode, the learning device 1000 may repeat the process of training the deep Q-network 200 for every iteration the transition vector is generated.

Given Fully annotated Training Database: T_ref
Given Unlabeled Database: U_ref
Given Validation Database: V
Initialize replay memory P to capacity N
Initialize Q-Net with random weights
for episode=1, M do
Initialize Unlabeled Database: U←U_ref
Initialize Training Database: T←T_ref
Train Detection-Net with T
for t=1, L do
   $x_t$←random select from U
   $s_t$←Detection-Net ($x_t$)
   $a_t$←Q-Net($s_t$)
   U←U−$x_t$
   if $a_t$ is select then
     T←T+$x_t$+$s_t$
     Train Detection-Net with T
   end if
   $r_t$←Test Detection-Net with V
   $x_{t+1}$←random select from U
   $s_{t+1}$←Detection-Net ($x_{t+1}$)
   Store transition ($s_t,a_t,r_t,s_{t+1}$) in P
   Sample random minibatch of transitions ($s_t,a_t,r_t,s_{t+1}$) from P
   train Q-Net
end for // t
end for // episode By using the method as explained above, the self-supervised learning of the detection network 100 may be simultaneously performed with the reinforcement learning of the detection network. However, the present disclosure is not limited thereto, and a method for performing the self-supervised learning of the detection network 100 by using the deep Q-network trained as explained above is as follows.

On condition that the deep Q-network 200 has been trained as explained above, a method for a self-learning device to perform the self-supervised learning of the detection network 100 by using the deep Q-network 200 is provided below by referring to FIGS. 4 and 5.

Figure 4:
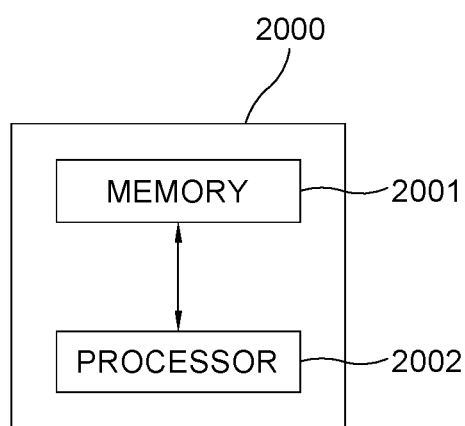
FIG. 4 a drawing schematically illustrating a self-learning device performing the self-supervised learning of the detection network by using the deep Q-network in accordance with one example embodiment of the present disclosure.

FIG. 4 a drawing schematically illustrating the self-learning device 2000 performing the self-supervised learning of the detection network 100 by using the deep Q-network 200 in accordance with one example embodiment of the present disclosure.

By referring to FIG. 4, the self-learning device 2000 may include a memory 2001 for performing the self-supervised learning of the detection network 100 by using the deep Q-network 200, and a processor 2002 for performing the self-supervised learning of the detection network 100 by using the deep Q-network 200 according to the instructions in the memory 2001.

Specifically, the self-learning device 2000 may achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the self-learning device 2000 may be installed on a cloud platform, IoT devices, imaging devices, autonomous vehicles, robots, etc. from which the unlabeled training data are continuously provided. If necessary, parameters of the detection network 100 and parameters of the deep Q-network 200 may be transmitted from the self-learning device 2000 to the learning device 1000 on a regular basis to receive updated parameters of the deep Q-network 200 from the learning device 1000. The learning device 1000 and the self-learning device 2000 may thus be physically separated and exchange data with each other, but the present disclosure is not limited thereto, and when there is no capacity limitation or physical limitation or when necessary, the learning device 1000 and the self-learning device 2000 may function as a same device.

A process for the self-learning device 2000 configured as explained above to perform the self-supervised learning of the detection network 100 by using the deep Q-network 200 in accordance with one example embodiment of the present disclosure is explained below by referring to FIG. 5. In the following description, detailed explanation of parts that can be easily understood from the description provided by referring to FIGS. 2 and 3 are omitted.

Figure 5:
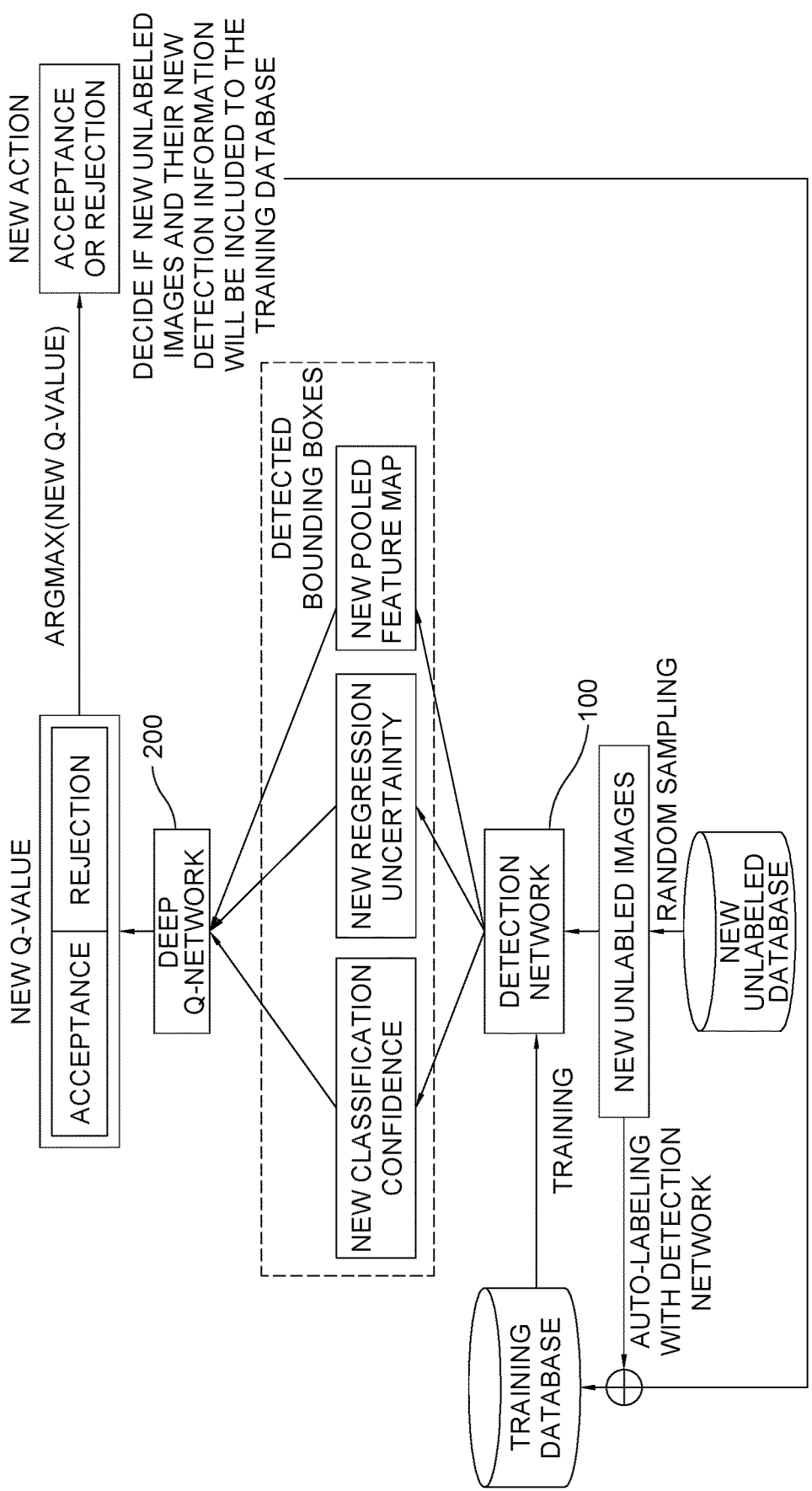
FIG. 5 is a drawing schematically illustrating a process for performing the self-supervised learning of the detection network by using the deep Q-network in accordance with one example embodiment of the present disclosure.

By referring to FIG. 5, on condition that the deep Q-network 200 has been trained as demonstrated above, the self-learning device 2000, upon acquiring at least one new unlabeled image from a new unlabeled database, may input the new unlabeled image into the detection network 100, to thereby allow the detection network 100 to perform the object detection on the new unlabeled image and thus to generate new object detection information. Herein, the new labeled image may be randomly selected from the new unlabeled database. Also, the new unlabeled database may be storing new labeled images which have not been annotated with their corresponding ground truths.

In detail, the self-learning device 2000 may input the new unlabeled image into the detection network 100, to thereby allow the detection network 100 to apply the convolution operation to the new unlabeled image through the convolutional layer, and thus generate a new feature map corresponding to the new unlabeled image. Then, the self-learning device 2000 may generate new ROIs corresponding to new proposed regions where $k_3$ objects are predicted to be positioned on the new unlabeled image through the region proposal network by referring to the new feature map, and perform the ROI pooling operation on each of the new proposed regions corresponding to each of the new ROIs on the new feature map through the pooling layer, and thus generate each of new pooled feature maps corresponding to each of the new ROIs. Subsequently, the self-learning device 2000 may apply the first Fully-Connected operation to each of the new pooled feature maps through the Fully-Connected layer and thus generate each piece of new regression information and each piece of new classification information corresponding to each of the new ROIs. Lastly, the self-learning device 2000 may generate a first new bounding box to a $k_3$th new bounding box and first new classification information to $k_3$th new classification information, respectively corresponding to the $k_3$ objects included in the new unlabeled image, by referring to each piece of the new regression information and each piece of the new classification information corresponding to each of the new ROIs. Herein, the first new classification information to the $k_3$th new classification information may include a first new classification confidence to a $k_3$th new classification confidence, and the first new bounding box to the $k_3$th new bounding box may include a first new regression uncertainty to a $k_3$th new regression uncertainty. Also, $k_3$ is an integer bigger than or equal to 1, and may vary depending on the number of objects present in the new unlabeled image.

Following, the self-learning device 2000 may generate a new state set by referring to the new object detection information, wherein the new state set includes the first new classification confidence to the $k_3$th new classification confidence, the first new regression uncertainty to the $k_3$th new regression uncertainty, and a first new pooled feature map to a $k_3$th new pooled feature map, respectively corresponding to the first new bounding box indicating a 1st object included in the new unlabeled image to the $k_3$th new bounding box indicating a $k_3$th object included in the new unlabeled image.

Accordingly, the self-learning device 2000 may input the new state set into the deep Q-network 200, to thereby allow the deep Q-network 200 to perform the learning operation on the new state set and thus to generate a new Q-value including a new acceptance score and a new rejection score. Then, the self-learning device 2000 may generate a new action by applying the argMax function to the new Q-value.

In detail, the self-learning device 2000 may allow the deep Q-network 200 to apply the second Fully-Connected operation to the first new classification confidence to the $k_3$th new classification confidence, the first new regression uncertainty to the $k_3$th new regression uncertainty, and the first new pooled feature map to the $k_3$th new pooled feature map, respectively corresponding to the first new bounding box to the $k_3$th new bounding box, to thereby generate a first new intermediate acceptance score to a $k_3$th new intermediate acceptance score and a first new intermediate rejection score to a $k_3$th new intermediate rejection score, respectively corresponding to the first new bounding box to the $k_3$th new bounding box.

Herein, the self-learning device 2000 may allow the deep Q-network 200 to execute at least one 1×1 convolution operation and an m×m convolution operation on the first new pooled feature map to the $k_3$th new pooled feature map, to thereby generate a first new feature value to a $k_3$th new feature value, and then execute the second Fully-Connected operation on the first new classification confidence to the $k_3$th new classification confidence, the first new regression uncertainty to the $k_3$th new regression uncertainty, and the first new feature value to the $k_3$th new feature value. By doing so, data formats of components in the new state set, i.e., the first new classification confidence to the $k_3$th new classification confidence, the first new regression uncertainty to the $k_3$th new regression uncertainty, and the first new pooled feature map to the $k_3$th new pooled feature map, may be made to be identical or similar to one another, prior to executing the second Fully-Connection operation on the components in the new state set.

Afterwards, the self-learning device 2000 may average the first new intermediate acceptance score to the $k_3$th new intermediate acceptance score, thus generating the new acceptance score, and average the first new intermediate rejection score to the $k_3$th new intermediate rejection score, thus generating the new rejection score, to thereby generate the new Q-value including the new acceptance score and the new rejection score.

Following, if the new action generated by applying the argMax function to the Q-value is determined as corresponding to an acceptance of the new unlabeled image, the self-learning device 2000 may add a new labeled image to the training database as the training data wherein the new labeled image is generated by inserting the new object detection information into the new unlabeled image. At the same time, the self-learning device 2000 may delete the new unlabeled image from the new unlabeled database, and retrain the detection network 100 by using at least one of the training data included in the training database.

On the other hand, if the new action is determined as corresponding to a rejection of the new unlabeled image, the self-learning device 2000 may delete the new unlabeled image from the new unlabeled database.

The self-supervised learning of the detection network 100 as explained above may be carried out by using a pseudocode below. In the pseudocode below, the detection network 100 is represented as Detection-Net, and the deep Q-network 200 is represented as Q-Net. According to the pseudocode, the self-learning device 2000 may generate the new state set, the new Q-value and the new action and repeat the process of training the detection network 100 for every iteration the new unlabeled image is obtained from the new unlabeled database.

Given Fully annotated Training Database: T
Given Unlabeled Database: U
Train Detection-Net with T
for t=1, L do
$x_t \leftarrow$ random select from U
$s_t \leftarrow$ Detection-Net($x_t$)
$a_t \leftarrow$ Q-Net($s_t$)
U←U-$x_t$
if $a_t$ is select then
    T←T+$x_t$
    Train Detection-Net with T
end if
end for // t Meanwhile, the training database used for the self-supervised learning of the detection network 100 may include those training data used for the self-supervised learning of the detection network 100 during the stage of the reinforcement learning of the deep Q-network 200. However, the present disclosure is not limited thereto, and may include cases where the training database includes a new set of training data instead of an original set of training data used for the self-supervised learning of the detection network 100 during the stage of the reinforcement learning of the deep Q-network 200.

Also, the self-learning device 2000 may allow a new detection network different from the detection network 100 above to perform the process of the object detection to generate the new object detection information on the new unlabeled image selected from the new unlabeled database. In other words, the deep Q-network 200 trained through the reinforcement learning may be used for self-supervised learning of the new detection network instead of the self-supervised learning of the detection network 100 originally used for the reinforcement learning of the deep Q-network 200.

The present disclosure has an effect of effectively selecting the training data useful for increasing an accuracy of the detection network by using the deep-Q network to generate Q-values based on object detection results of the detection network on the training data.

The present disclosure has another effect of performing the reinforcement learning of the deep Q-network connected to the detection network by using the accuracy of the detection network as the reward such that the deep Q-network is trained to produce the Q-values capable of selecting the training data useful for increasing the accuracy of the detection network.

The present disclosure has still another effect of enabling the self-supervised learning of the detection network by using the training data selected on the basis of the Q-values generated from the deep Q-network.

Besides, the embodiments of the present disclosure as explained above can be implemented in a form of executable program command through a variety of computer means recordable to computer readable media. The computer readable media may store solely or in combination, program commands, data files, and data structures. The program commands recorded in the media may be components specially designed for the present disclosure or may be usable for a skilled human in a field of computer software. The computer readable media include, but are not limited to, magnetic media such as hard drives, floppy diskettes, magnetic tapes, memory cards, solid-state drives, USB flash drives, optical media such as CD-ROM and DVD, magneto-optical media such as floptical diskettes and hardware devices such as a read-only memory (ROM), a random access memory (RAM), and a flash memory specially designed to store and carry out program commands. Program commands may include not only a machine language code made by a compiler but also a high level code that can be used by an interpreter etc., which is executed by a computer. The aforementioned hardware device may work as more than a software module to perform the action of the present disclosure and they may do the same in the opposite case. The hardware device may include a processor such as a CPU or a GPU, combined with a memory device such as ROM or RAM to store the program commands, configured to execute the commands stored in the memory, and a communication part which can exchange signals with external devices. In addition, the hardware device may include a keyboard, a mouse, and any other external input device to receive commands prepared by developers.

As seen above, the present disclosure has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for performing self-supervised learning of a deep-learning based detection network by using a deep Q-network, comprising steps of:

(a) on condition that a detection network capable of performing an object detection has been trained with at least one training data stored in a training database, a learning device, upon acquiring at least one first unlabeled image from an unlabeled database, performing or supporting another device to perform processes of (i) inputting the first unlabeled image into the detection network, to thereby allow the detection network to perform the object detection on the first unlabeled image and thus to generate first object detection information, (ii) generating a first state set by referring to the first object detection information, wherein the first state set includes a $(1\_1)$-st classification confidence to a $(1\_k_1)$-th classification confidence, a $(1\_1)$-st regression uncertainty to a $(1\_k_1)$-th regression uncertainty, and a $(1\_1)$-st pooled feature map to a $(1\_k_1)$-th pooled feature map, respectively corresponding to a $(1\_1)$-st bounding box indicating a 1st object included in the first unlabeled image to a $(1\_k_1)$-th bounding box indicating a $k_1$th object included in the first unlabeled image, and wherein $k_1$ is an integer bigger than or equal to 1, (iii) inputting the first state set into a deep Q-network, to thereby allow the deep Q-network to perform a learning operation on the first state set and thus to generate a Q-value including an acceptance score and a rejection score, and (iv) generating an action by applying an argMax function to the Q-value;

(b) the learning device performing or supporting another device to perform processes of (i) (i-1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (i-2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii) upon acquiring at least one second unlabeled image from the unlabeled database, (ii-1) inputting the second unlabeled image into the detection network, to thereby allow the detection network to perform the object detection on the second unlabeled image and thus to generate second object detection information, (ii-2) generating a second state set by referring to the second object detection information, wherein the second state set includes a $(2\_1)$-st classification confidence to a $(2\_k_2)$-th classification confidence, a $(2\_1)$-st regression uncertainty to a $(2\_k_2)$-th regression uncertainty, and a $(2\_1)$-st pooled feature map to a $(2\_k_2)$-th pooled feature map, respectively corresponding to a $(2\_1)$-st bounding box indicating a 1st object included in the second unlabeled image to a $(2\_k_2)$-th bounding box indicating a $k_2$th object included in the second unlabeled image, and wherein $k_2$ refers to an integer bigger than or equal to 1, and (ii-3) storing the first state set, the action, the reward, and the second state set as elements of a transition vector in a memory; and (c) the learning device performing or supporting another device to perform a process of generating a minibatch by sampling at least one specific transition vector to be used as at least one transition vector for training from the memory and then training the deep Q-network by using the minibatch such that the deep Q-network outputs the action for increasing the reward according to the first state set and the second state set.

2. The method of claim 1, wherein, at the step of (a), the learning device performs or supports another device to perform a process of allowing the deep Q-network to (i) apply at least one Fully-Connected operation to the $(1\_1)$-st classification confidence to the $(1\_k_1)$-th classification confidence, the $(1\_1)$-st regression uncertainty to the $(1\_k_1)$-th regression uncertainty, and the $(1\_1)$-st pooled feature map to the $(1\_k_1)$-th pooled feature map, respectively corresponding to the $(1\_1)$-st bounding box to the $(1\_k_1)$-th bounding box, to thereby generate a first intermediate acceptance score to a $k_1$th intermediate acceptance score and a first intermediate rejection score to a $k_1$th intermediate rejection score, respectively corresponding to the $(1\_1)$-st bounding box to the $(1\_k_1)$-th bounding box, and (ii) average the first intermediate acceptance score to the $k_1$th intermediate acceptance score, thus generating the acceptance score, and average the first intermediate rejection score to the $k_1$th intermediate rejection score, thus generating the rejection score, to thereby generate the Q-value including the acceptance score and the rejection score.

3. The method of claim 2, wherein the learning device performs or supports another device to perform a process of allowing the deep Q-network to execute at least one 1×1 convolution operation and an m×m convolution operation on the $(1\_1)$-st pooled feature map to the $(1\_k_1)$-th pooled feature map, to thereby generate a first feature value to a $k_1$th feature value, and then execute the Fully-Connected operation on the $(1\_1)$-st classification confidence to the $(1\_k_1)$-th classification confidence, the $(1\_1)$-st regression uncertainty to the $(1\_k_1)$-th regression uncertainty, and the first feature value to the $k_1$th feature value, to thereby generate the first intermediate acceptance score to the $k_1$th intermediate acceptance score and the first intermediate rejection score to the $k_1$th intermediate rejection score.

4. The method of claim 1, wherein the step (a), the step (b) and the step (c) are performed iteratively to thereby generate multiple transition vectors, and wherein, at the step of (c) for every iteration, the learning device performs or supports another device to perform a process of randomly selecting $a*n$ or $2^n$ specific transition vectors to be used as multiple transition vectors for training from the memory in proportion to an accumulated volume of the transition vectors in the memory, to thereby generate the minibatch, and then training the deep Q-network by using the minibatch, wherein a and n are respectively integers bigger than or equal to 1 and n is increased by 1 for every predetermined number of iterations.

5. The method of claim 1, wherein the step (a), the step (b) and the step (c) are performed iteratively to thereby generate multiple transition vectors,
wherein the memory includes a replay memory, and
wherein, at the step of (c) for every iteration, the learning device performs or supports another device to perform a process of (i) transmitting each of the transition vectors to the replay memory, to thereby replace its corresponding oldest previously generated transition vector with each of the transition vectors according to a predetermined capacity of a cyclic buffer and thus to store each of the transition vectors in the replay memory, and (ii) generating the minibatch by randomly sampling specific transition vectors to be used as multiple transition vectors for training from the replay memory.

6. The method of claim 1, wherein, at the step of (a), the learning device performs or supports another device to perform a process of inputting the first unlabeled image into the detection network, to thereby allow the detection network to (i) apply at least one convolution operation to the first unlabeled image through at least one convolutional layer, and thus generate a first feature map corresponding to the first unlabeled image, (ii) generate ROIs corresponding to proposed regions where the $k_1$ objects are predicted to be positioned on the first unlabeled image through a region proposal network by referring to the first feature map, (iii) perform an ROI pooling operation on each of the proposed regions corresponding to each of the ROIs on the first feature map through a pooling layer, and thus generate each of pooled feature maps corresponding to each of the ROIs, (iv) apply at least one Fully-Connected operation to each of the pooled feature maps through at least one Fully-Connected layer and thus generate each piece of regression information and each piece of classification information corresponding to each of the ROIs, and (v) generate the $(1\_1)$-st bounding box to the $(1\_k_1)$-th bounding box and $(1\_1)$-st classification information to $(1\_k_1)$-th classification information, respectively corresponding to the $k_1$ objects included in the first unlabeled image, by referring to each piece of the regression information and each piece of the classification information corresponding to each of the ROIs.

7. A method for performing self-supervised learning of a deep-learning based detection network by using a deep Q-network, comprising steps of:
(a) on condition that (i) a detection network capable of performing an object detection has been trained with at least one training data stored in a training database and then a learning device, upon acquiring at least one first unlabeled image from an unlabeled database, has performed or supported another device to perform processes of (i-1) inputting the first unlabeled image into the detection network, to thereby allow the detection network to perform the object detection on the first unlabeled image and thus to generate first object detection information, (i-2) generating a first state set by referring to the first object detection information, wherein the first state set includes a $(1\_1)$-st classification confidence to a $(1\_k_1)$-th classification confidence, a $(1\_1)$-st regression uncertainty to a $(1\_k_1)$-th regression uncertainty, and a $(1\_1)$-st pooled feature map to a $(1\_k_1)$-th pooled feature map, respectively corresponding to a $(1\_1)$-st bounding box indicating a 1st object included in the first unlabeled image to a $(1\_k_1)$-th bounding box indicating a $k_1$th object included in the first unlabeled image, and wherein $k_1$ is an integer bigger than or equal to 1, (i-3) inputting the first state set into a deep Q-network, to thereby allow the deep Q-network to perform a learning operation on the first state set and thus to generate a Q-value including an acceptance score and a rejection score, and (i-4) generating an action by applying an argMax function to the Q-value, (ii) (ii-1) (1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii-2) upon acquiring at least one second unlabeled image from the unlabeled database, (1) inputting the second unlabeled image into the detection network, to thereby allow the detection network to perform the object detection on the second unlabeled image and thus to generate second object detection information, (2) generating a second state set by referring to the second object detection information, wherein the second state set includes a $(2\_1)$-st classification confidence to a $(2\_k_2)$-th classification confidence, a $(2\_1)$-st regression uncertainty to a $(2\_k_2)$-th regression uncertainty, and a $(2\_1)$-st pooled feature map to a $(2\_k_2)$-th pooled feature map, respectively corresponding to a $(2\_1)$-st bounding box indicating a 1st object included in the second unlabeled image to a $(2\_k_2)$-th bounding box indicating a $k_2$th object included in the second unlabeled image, and wherein $k_2$ refers to an integer bigger than or equal to 1, and (3) storing the first state set, the action, the reward, and the second state set as elements of a transition vector in a memory, and (iii) generating a minibatch by sampling at least one specific transition vector to be used as at least one transition vector for training from the memory and then training the deep Q-network by using the minibatch such that the deep Q-network outputs the action for increasing the reward according to the first state set and the second state set, a self-learning device, upon acquiring at least one new unlabeled image from a new unlabeled database, performing or supporting another device to perform processes of (i) inputting the new unlabeled image into the detection network, to thereby allow the detection network to perform the object detection on the new unlabeled image and thus to generate new object detection information, (ii) generating a new state set by referring to the new object detection information, wherein the new state set includes a first new classification confidence to a $k_3$th new classification confidence, a first new regression uncertainty to a $k_3$th new regression uncertainty, and a first new pooled feature map to a $k_3$th new pooled feature map, respectively corresponding to a first new bounding box indicating a 1st object included in the new unlabeled image to a $k_3$th new bounding box indicating a $k_3$th object included in the new unlabeled image, and wherein the $k_3$ refers to an integer bigger than or equal to 1, (iii) inputting the new state set into the deep Q-network, to thereby allow the deep Q-network to perform the learning operation on the new state set and thus to generate a new Q-value including a new acceptance score and a new rejection score, and (iv) generating a new action by applying the argMax function to the new Q-value; and (b) the self-learning device performing or supporting another device to perform processes of (i) if the new action is determined as corresponding to an acceptance of the new unlabeled image, adding a new labeled image to the training database as the training data wherein the new labeled image is generated by inserting the new object detection information into the new unlabeled image, deleting the new unlabeled image from the new unlabeled database, and retraining the detection network by using at least one of the training data included in the training database, and (ii) if the new action is determined as corresponding to a rejection of the new unlabeled image, deleting the new unlabeled image from the new unlabeled database.

8. The method of claim 7, wherein, at the step of (a), the self-learning device performs or supports another device to perform a process of allowing the deep Q-network to (i) apply at least one Fully-Connected operation to the first new classification confidence to the $k_3$th new classification confidence, the first new regression uncertainty to the $k_3$th new regression uncertainty, and the first new pooled feature map to the $k_3$th new pooled feature map, respectively corresponding to the first new bounding box to the $k_3$th new bounding box, to thereby generate a first new intermediate acceptance score to a $k_3$th new intermediate acceptance score and a first new intermediate rejection score to a $k_3$th new intermediate rejection score, respectively corresponding to the first new bounding box to the $k_3$th new bounding box, and (ii) average the first new intermediate acceptance score to the $k_3$th new intermediate acceptance score, thus generating the new acceptance score, and average the first new intermediate rejection score to the $k_3$th new intermediate rejection score, thus generating the new rejection score, to thereby generate the new Q-value including the new acceptance score and the new rejection score.

9. The method of claim 8, wherein the self-learning device performs or supports another device to perform a process of allowing the deep Q-network to execute at least one 1×1 convolution operation and an m×m convolution operation on the first new pooled feature map to the $k_3$th new pooled feature map, to thereby generate a first new feature value to a $k_3$th new feature value, and then execute the Fully-Connected operation on the first new classification confidence to the $k_3$th new classification confidence, the first new regression uncertainty to the $k_3$th new regression uncertainty, and the first new feature value to the $k_3$th new feature value, to thereby generate the first new intermediate acceptance score to the $k_3$th new intermediate acceptance score and the first new intermediate rejection score to the $k_3$th new intermediate rejection score.

10. The method of claim 7, wherein, at the step of (a), the self-learning device performs or supports another device to perform a process of inputting the new unlabeled image into the detection network, to thereby allow the detection network to (i) apply at least one convolution operation to the new unlabeled image through at least one convolutional layer, and thus generate a new feature map corresponding to the new unlabeled image, (ii) generate new ROIs corresponding to new proposed regions where the $k_3$ objects are predicted to be positioned on the new unlabeled image through a region proposal network by referring to the new feature map, (iii) perform an ROI pooling operation on each of the new proposed regions corresponding to each of the new ROIs on the new feature map through a pooling layer, and thus generate each of new pooled feature maps corresponding to each of the new ROIs, (iv) apply at least one Fully-Connected operation to each of the new pooled feature maps through at least one Fully-Connected layer and thus generate each piece of new regression information and each piece of new classification information corresponding to each of the new ROIs, and (v) generate the first new bounding box to the $k_3$th new bounding box and first new classification information to $k_3$th new classification information, respectively corresponding to the $k_3$ objects included in the new unlabeled image, by referring to each piece of the new regression information and each piece of the new classification information corresponding to each of the new ROIs.

11. A learning device for performing self-supervised learning of a deep-learning based detection network by using a deep Q-network, comprising:

at least one memory that stores instructions; and at least one processor configured to execute the instructions to perform or support another device to perform: processes of (I) on condition that a detection network capable of performing an object detection has been trained with at least one training data stored in a training database, upon acquiring at least one first unlabeled image from an unlabeled database, (i) inputting the first unlabeled image into the detection network, to thereby allow the detection network to perform the object detection on the first unlabeled image and thus to generate first object detection information, (ii) generating a first state set by referring to the first object detection information, wherein the first state set includes a (1_1)-st classification confidence to a (1_$k_1$)-th classification confidence, a (1_1)-st regression uncertainty to a (1_$k_1$)-th regression uncertainty, and a (1_1)-st pooled feature map to a (1_$k_1$)-th pooled feature map, respectively corresponding to a (1_1)-st bounding box indicating a 1st object included in the first unlabeled image to a (1_$k_1$)-th bounding box indicating a $k_1$th object included in the first unlabeled image, and wherein $k_1$ is an integer bigger than or equal to 1, (iii) inputting the first state set into a deep Q-network, to thereby allow the deep Q-network to perform a learning operation on the first state set and thus to generate a Q-value including an acceptance score and a rejection score, and (iv) generating an action by applying an argMax function to the Q-value, (II) (i) (i-1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (i-2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii) upon acquiring at least one second unlabeled image from the unlabeled database, (ii-1) inputting the second unlabeled image into the detection network, to thereby allow the detection network to perform the object detection on the second unlabeled image and thus to generate second object detection information, (ii-2) generating a second state set by referring to the second object detection information, wherein the second state set includes a $(2\_1)$-st classification confidence to a $(2\_k_2)$-th classification confidence, a $(2\_1)$-st regression uncertainty to a $(2\_k_2)$-th regression uncertainty, and a $(2\_1)$-st pooled feature map to a $(2\_k_2)$-th pooled feature map, respectively corresponding to a $(2\_1)$-st bounding box indicating a 1st object included in the second unlabeled image to a $(2\_k_2)$-th bounding box indicating a $k_2$th object included in the second unlabeled image, and wherein $k_2$ refers to an integer bigger than or equal to 1, and (ii-3) storing the first state set, the action, the reward, and the second state set as elements of a transition vector in a memory, and (III) generating a minibatch by sampling at least one specific transition vector to be used as at least one transition vector for training from the memory and then training the deep Q-network by using the minibatch such that the deep Q-network outputs the action for increasing the reward according to the first state set and the second state set.

12. The learning device of claim 11, wherein, at the process of (I), the processor performs or supports another device to perform a process of allowing the deep Q-network to (i) apply at least one Fully-Connected operation to the $(1\_1)$-st classification confidence to the $(1\_k_1)$-th classification confidence, the $(1\_1)$-st regression uncertainty to the $(1\_k_1)$-th regression uncertainty, and the $(1\_1)$-st pooled feature map to the $(1\_k_1)$-th pooled feature map, respectively corresponding to the $(1\_1)$-st bounding box to the $(1\_k_1)$-th bounding box, to thereby generate a first intermediate acceptance score to a $k_1$th intermediate acceptance score and a first intermediate rejection score to a $k_1$th intermediate rejection score, respectively corresponding to the $(1\_1)$-st bounding box to the $(1\_k_1)$-th bounding box, and (ii) average the first intermediate acceptance score to the $k_1$th intermediate acceptance score, thus generating the acceptance score, and average the first intermediate rejection score to the $k_1$th intermediate rejection score, thus generating the rejection score, to thereby generate the Q-value including the acceptance score and the rejection score.

13. The learning device of claim 12, wherein the processor performs or supports another device to perform a process of allowing the deep Q-network to execute at least one 1×1 convolution operation and an m×m convolution operation on the $(1\_1)$-st pooled feature map to the $(1\_k_1)$-th pooled feature map, to thereby generate a first feature value to a $k_1$th feature value, and then execute the Fully-Connected operation on the $(1\_1)$-st classification confidence to the $(1\_k_1)$-th classification confidence, the $(1\_1)$-st regression uncertainty to the $(1\_k_1)$-th regression uncertainty, and the first feature value to the $k_1$th feature value, to thereby generate the first intermediate acceptance score to the $k_1$th intermediate acceptance score and the first intermediate rejection score to the $k_1$th intermediate rejection score.

14. The learning device of claim 11, wherein the process (I), the process (II) and the process (III) are performed iteratively to thereby generate multiple transition vectors, and wherein, at the process of (III) for every iteration, the processor performs or supports another device to perform a process of randomly selecting a*n or $2^n$ specific transition vectors to be used as multiple transition vectors for training from the memory in proportion to an accumulated volume of the transition vectors in the memory, to thereby generate the minibatch, and then training the deep Q-network by using the minibatch, wherein a and n are respectively integers bigger than or equal to 1 and n is increased by 1 for every predetermined number of iterations.

15. The learning device of claim 11, wherein the process (I), the process (II) and the process (III) are performed iteratively to thereby generate multiple transition vectors, wherein the memory includes a replay memory, and wherein, at the process of (III) for every iteration, the processor performs or supports another device to perform a process of (i) transmitting each of the transition vectors to the replay memory, to thereby replace its corresponding oldest previously generated transition vector with each of the transition vectors according to a predetermined capacity of a cyclic buffer and thus to store each of the transition vectors in the replay memory, and (ii) generating the minibatch by randomly sampling specific transition vectors to be used as multiple transition vectors for training from the replay memory.

16. The learning device of claim 11, wherein, at the process of (I), the processor performs or supports another device to perform a process of inputting the first unlabeled image into the detection network, to thereby allow the detection network to (i) apply at least one convolution operation to the first unlabeled image through at least one convolutional layer, and thus generate a first feature map corresponding to the first unlabeled image, (ii) generate ROIs corresponding to proposed regions where the $k_1$ objects are predicted to be positioned on the first unlabeled image through a region proposal network by referring to the first feature map, (iii) perform an ROI pooling operation on each of the proposed regions corresponding to each of the ROIs on the first feature map through a pooling layer, and thus generate each of pooled feature maps corresponding to each of the ROIs, (iv) apply at least one Fully-Connected operation to each of the pooled feature maps through at least one Fully-Connected layer and thus generate each piece of regression information and each piece of classification information corresponding to each of the ROIs, and (v) generate the $(1\_1)$-st bounding box to the $(1\_k_1)$-th bounding box and $(1\_1)$-st classification information to $(1\_k_1)$-th classification information, respectively corresponding to the $k_1$ objects included in the first unlabeled image, by referring to each piece of the regression information and each piece of the classification information corresponding to each of the ROIs.

17. A self-learning device for performing self-supervised learning of a deep-learning based detection network by using a deep Q-network, comprising:

at least one memory that stores instructions; and at least one processor configured to execute the instructions to perform or support another device to perform:

processes of (I) on condition that (i) a detection network capable of performing an object detection has been trained with at least one training data stored in a training database and then a learning device, upon acquiring at least one first unlabeled image from an unlabeled database, has performed or supported another device to perform processes of (i-1) inputting the first unlabeled image into the detection network, to thereby allow the detection network to perform the object detection on the first unlabeled image and thus to generate first object detection information, (i-2) generating a first state set by referring to the first object detection information, wherein the first state set includes a $(1\_1)$-st classification confidence to a $(1\_k_1)$-th classification confidence, a $(1\_1)$-st regression uncertainty to a $(1\_k_1)$-th regression uncertainty, and a $(1\_1)$-st pooled feature map to a $(1\_k_1)$-th pooled feature map, respectively corresponding to a $(1\_1)$-st bounding box indicating a 1st object included in the first unlabeled image to a $(1\_k_1)$-th bounding box indicating a $k_1$th object included in the first unlabeled image, and wherein $k_1$ is an integer bigger than or equal to 1, (i-3) inputting the first state set into a deep Q-network, to thereby allow the deep Q-network to perform a learning operation on the first state set and thus to generate a Q-value including an acceptance score and a rejection score, and (i-4) generating an action by applying an argMax function to the Q-value, (ii) (ii-1) (1) if the action is determined as corresponding to an acceptance of the first unlabeled image, adding a labeled image to the training database as the training data wherein the labeled image is generated by inserting the first object detection information into the first unlabeled image, deleting the first unlabeled image from the unlabeled database, retraining the detection network by using at least one of the training data included in the training database, and thus generating a reward by referring to a first accuracy wherein the first accuracy is obtained from a result of testing the detection network by using a validation database, (2) if the action is determined as corresponding to a rejection of the first unlabeled image, deleting the first unlabeled image from the unlabeled database and generating the reward by referring to a second accuracy wherein the second accuracy is obtained from a result of testing the detection network by using the validation database, and (ii-2) upon acquiring at least one second unlabeled image from the unlabeled database, (1) inputting the second unlabeled image into the detection network, to thereby allow the detection network to perform the object detection on the second unlabeled image and thus to generate second object detection information, (2) generating a second state set by referring to the second object detection information, wherein the second state set includes a $(2\_1)$-st classification confidence to a $(2\_k_2)$-th classification confidence, a $(2\_1)$-st regression uncertainty to a $(2\_k_2)$-th regression uncertainty, and a $(2\_1)$-st pooled feature map to a $(2\_k_2)$-th pooled feature map, respectively corresponding to a $(2\_1)$-st bounding box indicating a 1st object included in the second unlabeled image to a $(2\_k_2)$-th bounding box indicating a $k_2$th object included in the second unlabeled image, and wherein $k_2$ refers to an integer bigger than or equal to 1, and (3) storing the first state set, the action, the reward, and the second state set as elements of a transition vector in a memory, and (iii) generating a minibatch by sampling at least one specific transition vector to be used as at least one transition vector for training from the memory and then training the deep Q-network by using the minibatch such that the deep Q-network outputs the action for increasing the reward according to the first state set and the second state set, upon acquiring at least one new unlabeled image from a new unlabeled database, (i) inputting the new unlabeled image into the detection network, to thereby allow the detection network to perform the object detection on the new unlabeled image and thus to generate new object detection information, (ii) generating a new state set by referring to the new object detection information, wherein the new state set includes a first new classification confidence to a $k_3$th new classification confidence, a first new regression uncertainty to a $k_3$th new regression uncertainty, and a first new pooled feature map to a $k_3$th new pooled feature map, respectively corresponding to a first new bounding box indicating a 1st object included in the new unlabeled image to a $k_3$th new bounding box indicating a $k_3$th object included in the new unlabeled image, and wherein the $k_3$ refers to an integer bigger than or equal to 1, (iii) inputting the new state set into the deep Q-network, to thereby allow the deep Q-network to perform the learning operation on the new state set and thus to generate a new Q-value including a new acceptance score and a new rejection score, and (iv) generating a new action by applying the argMax function to the new Q-value, and (II) (i) if the new action is determined as corresponding to an acceptance of the new unlabeled image, adding a new labeled image to the training database as the training data wherein the new labeled image is generated by inserting the new object detection information into the new unlabeled image, deleting the new unlabeled image from the new unlabeled database, and retraining the detection network by using at least one of the training data included in the training database, and (ii) if the new action is determined as corresponding to a rejection of the new unlabeled image, deleting the new unlabeled image from the new unlabeled database.

18. The self-learning device of claim 17, wherein, at the process of (I), the processor performs or supports another device to perform a process of allowing the deep Q-network to (i) apply at least one Fully-Connected operation to the first new classification confidence to the $k_3$th new classification confidence, the first new regression uncertainty to the $k_3$th new regression uncertainty, and the first new pooled feature map to the $k_3$th new pooled feature map, respectively corresponding to the first new bounding box to the $k_3$th new bounding box, to thereby generate a first new intermediate acceptance score to a $k_3$th new intermediate acceptance score and a first new intermediate rejection score to a $k_3$th new intermediate rejection score, respectively corresponding to the first new bounding box to the $k_3$th new bounding box, and (ii) average the first new intermediate acceptance score to the $k_3$th new intermediate acceptance score, thus generating the new acceptance score, and average the first new intermediate rejection score to the $k_3$th new intermediate rejection score, thus generating the new rejection score, to thereby generate the new Q-value including the new acceptance score and the new rejection score.

19. The self-learning device of claim 18, wherein the processor performs or supports another device to perform a process of allowing the deep Q-network to execute at least one 1×1 convolution operation and an m×m convolution operation on the first new pooled feature map to the $k_3$th new pooled feature map, to thereby generate a first new feature value to a $k_3$th new feature value, and then execute the Fully-Connected operation on the first new classification confidence to the $k_3$th new classification confidence, the first new regression uncertainty to the $k_3$th new regression uncertainty, and the first new feature value to the $k_3$th new feature value, to thereby generate the first new intermediate acceptance score to the $k_3$th new intermediate acceptance score and the first new intermediate rejection score to the $k_3$th new intermediate rejection score.

20. The self-learning device of claim 17, wherein, at the process of (I), the processor performs or supports another device to perform a process of inputting the new unlabeled image into the detection network, to thereby allow the detection network to (i) apply at least one convolution operation to the new unlabeled image through at least one convolutional layer, and thus generate a new feature map corresponding to the new unlabeled image, (ii) generate new ROIs corresponding to new proposed regions where the $k_3$ objects are predicted to be positioned on the new unlabeled image through a region proposal network by referring to the new feature map, (iii) perform an ROI pooling operation on each of the new proposed regions corresponding to each of the new ROIs on the new feature map through a pooling layer, and thus generate each of new pooled feature maps corresponding to each of the new ROIs, (iv) apply at least one Fully-Connected operation to each of the new pooled feature maps through at least one Fully-Connected layer and thus generate each piece of new regression information and each piece of new classification information corresponding to each of the new ROIs, and (v) generate the first new bounding box to the $k_3$th new bounding box and first new classification information to $k_3$th new classification information, respectively corresponding to the $k_3$ objects included in the new unlabeled image, by referring to each piece of the new regression information and each piece of the new classification information corresponding to each of the new ROIs.

* * * * *